United States Patent [19]

Sinclair

[11] Patent Number: 4,528,361

[45] Date of Patent: Jul. 9, 1985

[54] COPOLYMERS OF HYDROXYMETHYLBENZOIC ACID AND LACTAM

[75] Inventor: David P. Sinclair, Winfield, Ill.

[73] Assignee: Standard Oil Company (Indiana), Chicago, Ill.

[21] Appl. No.: 563,114

[22] Filed: Dec. 19, 1983

[51] Int. Cl.³ .............................................. C08G 69/14
[52] U.S. Cl. ...................................... 528/323; 528/310; 528/331
[58] Field of Search ........................ 528/323, 310, 331

[56] References Cited

U.S. PATENT DOCUMENTS 3,342,785  9/1967  Blanchard .......................... 528/323
3,592,873  7/1971  Ishida et al. ........................ 528/323

Primary Examiner—Harold D. Anderson
Attorney, Agent, or Firm—William C. Clarke; William T. McClain; William H. Magidson

[57] ABSTRACT

High molecular weight linear aromatic amorphous copolymers comprising copolymers of p-, m-hydroxymethylbenzoic acid and mixtures thereof and a polyamide are prepared in ratios of 1:20 to 20:1. The resulting polymers have an inherent viscosity of at least 0.4 dl/g in a 60/40 phenol/tetrachloroethane solvent at 30° C., good molding properties and improved hydrophylic properties as compared with nylon-6.

7 Claims, No Drawings

COPOLYMERS OF HYDROXYMETHYLBENZOIC ACID AND LACTAM

FIELD OF THE INVENTION

This invention relates to high molecular weight linear polyester-amide copolymers. More particularly, this invention relates to a composition comprising a copolymer of 6-aminocaproic acid with p-hydroxymethylbenzoic acid (pHMBA), or m-hydroxymethylbenzoic acid (mHMBA) or mixtures thereof. These compositions mold well and have improved hydrophylic properties relative to polymerized caprolactam in the form of nylon-6. These compositions are thermoplastic amorphous or crystalline materials, depending on composition, have binder properties and are suitable for use as an adhesive in hot melt applications with good adhesion to a wide variety of substrates. These compositions also can be used to modify engineering plastics to improve pigment wetting. These thermoplastic copolymers can be easily molded by injection or vacuum forming techniques or by extrusion to form a wide variety of useful shaped articles.

Polycaproamide (nylon-6) is well-known in the art and has found significant commercial success both as a textile fiber and as a reinforcing fiber, such as tire cord, as well as an engineering plastic, both as a polymer and as a copolymer. Although the textile fibers and engineering applications obtained from the previously known caprolactam polymers and copolymers, much research effort is being continuously expended to improve the properties of these compounds. For example, polycaproamide is hygroscopic and must be processed dry to prevent hydrolysis. Injection molding grades contain less than 0.3 (wt)% water for satisfactory molding performance. Molded and extruded parts of polycaproamide will absorb moisture until equilibrium is reached and this is accompanied by a change in dimensions. Polymers of caprolactam typically are of crystalline nature and are thus not suited for some engineering applications requiring relatively high notched Izod values. Additionally, polymers of caprolactam are subject to oxidative embrittlement if continuously exposed to temperatures above 170° F. or intermittently at higher temperatures.

Poly(p- and m-methylenebenzoate)polyesters are derivatives of p- and m-hydroxymethylbenzoic acid, the methyl ester and polymers disclosed in U.S. Pat. No. 4,130,719, which is incorporated herein by reference. A similar procedure can be used to prepare ethyl and higher analogues.

Poly(p- and m-methylenebenzoate)polyesters are high molecular weight polymers having vastly improved properties over polymers previously known. This particular polymer is a normally amorphous polymer, has excellent impact strength and solvent resistance and is characterized by an inherent viscosity from 0.4 to 2.0 dl/g. It is particularly useful as an engineering plastic but can be used in other applications as well.

Copolymers of (p- or m-methylbenzoic acid) and 6-aminocaproic acid have not been previously prepared.

It has been unexpectedly found that p-hydroxymethylbenzoic acid, upon addition to ε-caprolactam, initiates the ring opening polymerization of ε-caprolactam. The polymers formed are random copolymers of p-hydroxymethylbenzoic acid and 6-aminocaproic acid. The polymers formed can be of any ratio of p-hydroxymethylbenzoic acid to 6-aminocaproic acid from 1:20 to 20:1. Ratio of copolymerization selected can be determined by properties required of the final copolymer.

It is an object of this invention to provide a novel copolymer of polycaproamide.

It is a further object of this invention to provide a novel copolymer of polycaproamide and poly(p- or m-methylenebenzoate) having an I.V. of at least 0.4 dl/g in a 60/40 phenol/tetrachloroethane solvent at 30° C.

It is a further object of this invention to provide a novel copolymer of polycaproamide which has improved hydrophyllic properties and is less subject to water absorption.

It is a further object of this invention to provide a novel copolymer of polycaproamide which is amorphous and is suitable for hot melt applications.

It is a further object of this invention to provide a novel copolymer of polycaproamide which is amorphous and has a relatively high notched Izod value.

It is a further object of this invention to provide a novel copolymer of polycaproamide which is less subject to thermal embrittlement at high temperatures than is nylon-6.

These and other objects will become apparent from the description given hereafter.

BACKGROUND OF THE INVENTION

The preparation of nylon-6, a polycaprolactam, has typically been by the ring-opening polymerization of ε-caprolatam in the presence of an initiator. For example, U.S. Pat. No. 2,241,321 teaches that the initiator or accelerator may vary considerably. In general, the catalyst should be a substance which reacts with the lactam either at the temperature of the reaction with rupture of the ring and formation of substances having at least one reactive end group or which determines the reactions which lead to the formation of such end groups. These initiator substances can be inorganic compounds such as water, organic hydroxyl- and sulfhydril compounds such as benzyl alcohol and thioglycollic acid dodecyl ester, amines and salts of organic amine compounds such as benzylamine and guanidine carbonate, organic acids and acid derivatives such as toluenesulfonic acid and its ethyl ester, salt-like organic compounds such as potassium carbazole, and substances which react to form organic acids such as benzoyl chloride. However, in the commercial production of nylon-6, water or 6-aminocaproic acid is used because water is volatile and inexpensive and 6-aminocaproic acid can be formed from ε-caprolactam.

Although p-hydroxymethylbenzoic acid which is the monomer for poly(p-methylenebenzoate) has been known since as early as 1872 when the acid was prepared by free-radical bromination of p-toluic acid to p-bromomethylbenzoic acid, hydrolysis with aqueous barium hydroxide and subsequent purification by recrystallization from water, the low molecular weight of the resulting polymer made the polymer obtained from the acid unsuitable for use in films, fiber and engineering plastics. Polymers having insufficient molecular weight have been demonstrated to have insufficient properties to permit useful applications. Molecular weight is correlated with measurement of inherent viscosity (I.V.). An inherent viscosity of the polymer which is lower than 0.4 dl/g, as measured in deciliters per gram (dl/g) in a 60/40 phenol/tetrachloroethane solvent at 30° C. is considered too low to allow use of the resulting polymer as a film, fiber or engineering plastic.

Polymers of p-hydroxymethylbenzoic acid having an inherent viscosity of at least 0.44 dl/g have been taught in commonly assigned U.S. Pat. No. 4,130,719 but copolymers of poly(p-methylenebenzoate) and polycaprolactam having an I.V. of at least 0.4 dl/g have not been previously known. Nylon-6 copolymers of polyesters typically have lower inherent viscosities because the polyester monomer acts as a monofunctional end capping agent under thermal conditions which limits chain length and molecular weight.

SUMMARY OF THE INVENTION

Copolymers of p-, or m-hydromethylbenzoic acid and mixtures thereof and 6-aminocaproic acid are prepared by reacting p- or m-hydroxymethylbenzoic acid and ϵ-caprolactam. The resulting copolymer compositions are amorphous and have an inherent viscosity of at least 0.4 dl/g in a 60/40 phenol tetrachlarethane solvent at 30° C., good molding properties and improved hydrophylic properties as compared to those of nylon-6.

DETAILS OF THE INVENTION

Copolymers of p- and m-hydroxymethylbenzoic acid and mixtures thereof and 6-aminocaproic acid are prepared by reacting p- or m-hydroxymethylbenzoic acid and mixtures thereof and ϵ-caprolactam. The resulting copolymer compositions are amorphous, have an inherent viscosity of at least 0.4 dl/g, have good molding properties and improved hydrophylic properties as compared with nylon-6.

The compositions can comprise poly(p-methylenebenzoate) or poly(m-methylenebenzoate) and a polycaproamide as copolymers or as physical blends or mixtures of homopolymers of poly(p-methylenebenzoate), poly(m-methylenebenzoate) and polycaproamides in varying proportions.

The compositions can comprise poly(p-methylenebenzoate) or poly(m-methylenebenzoate) with interpolymers of poly(p-methylenebenzoate), poly(methylenebenzoate) and polycaproamides in varying proportions.

Interpolymers are defined as polymer compositions intermediate between a physical blend and a totally random copolymer. Interpolymers occur due to the presence of a mixture of condensation polymers in the molding composition prior to the molding operation. The melt temperature of the molding operation, the percentage of each component and the time duration of the melt in the molding operation often determine the structure of the interpolymer and whether the polymer composition is that of a blend or of an interpolymer.

In the process of the invention, to prepare physical blends or interpolymers, 100 parts by weight of the homopolymer and blending polymer are mixed with the usual additives generally employed in the production of plastic products. These include, for example, flame retardants, oxidation inhibitors, UV stabilizers, coloring agents and other agents. Such products are utilized in the amounts normally employed with conventional copolymers and blends of polycaproamides.

Ratios by weight of 1:20 to 20:1 poly(p-methylenebenzoate), poly(m-methylenebenzoate) and mixtures thereof can be employed with polycaproamides. Preferable ratios are 1:20 to 1:1, depending upon desired physical characteristics of the resulting compound. Ratios of 1:1 can result in a blend rather than an interpolymer; however, inherent viscosity of the resulting composition is greater than 0.4 dl/g.

The molding composition, i.e., the copolymer, blend or interpolymer, with the usual additives is typically mixed at room temperature prior to charging the mixture to the hopper or inlet section of the plasticating screw of the injection molding machine. The mixture is then elevated in temperature and pressure until the mixture melts. The mixture is then batchwise injected into the mold.

The preferred temperature of the resin mixture just prior to injection is 150°–300° C. at an injection pressure of 100–2000 psi, typically about 400–500 psi. When the temperature and pressure conditions are noticeably outside these ranges, the components in the mixture can fail to perform satisfactorily. At temperature appreciably below 150° C., the plastic may not melt, thus yielding an unprocessible system. If pressures fall below about 400 psi the resulting polymer may not be completely injected into the mold in the polymer, thus causing cavities to be found in the final part.

The thermoplastic process, as currently practiced in injection molding, is used to fabricate large, relatively thick-wall structures. The process requires relatively long cooling times, on the order of minutes. As a result, extant processing machinery melts and stores large quantities of polymer mixture prior to each processing injection into the mold cavity. Thus the polymer mixture must remain thermally stable at processing temperatures (and pressures) for several minutes. An informal stability criterion is time-temperature, obtained by multiplying the melt temperature (°C.) by the residence time (sec) at this temperature prior to injection. A typical operating range for this criterion is 5,000–30,000 (°C.-sec) with upper limit being 60,000 (°C.-sec).

The thermoplastic resin products are suitable for use as adhesives in hot melt applications bonding a wide variety of difficult substrates and can be used to modify engineering plastics such as nylon-6,6, nylon-6, nylon-6T and epoxies to improve pigment wetting.

The term "homopolymer" as used in this specification and claims means a poly(p- or m-methylenebenzoate) having an I.V. of at least 0.4 dl/g, preferably from 0.5 to 0.7 I.V. The term blending polymer means any AB polyamide (A representing amine groups and B representing carboxyl groups) of the structural formula:

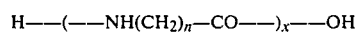

wherein n is a whole number from 2 to 20, and x is greater than 1, wherein the ratio of poly(p- or m-methylenebenzoate) to the blending polymer is from about 1:20 to about 20:1. Examples of blending polymers are nylon-4, nylon-5, nylon-6, nylon-8, nylon-9, nylon-10, nylon-11 and nylon-12. Nylon-6 is preferred because of wide-spread use. The above compositions can exist as blends in the above ranges or as compositions of poly(p-methylenebenzoate) and poly(m-methylenebenzoate) with interpolymers as defined previously in the same ranges.

The following non-limiting examples are given by way of illustration only.

EXAMPLE I p-(Hydroxymethyl)benzoic acid (p-HMBA) (0.61 g; 4 mmole) and ϵ-caprolactam (4.07 g; 36 mmole) were mixed together and placed in a (12 mm×140 mm) test tube equipped with an adaptor for a side arm take-off. A nitrogen bubbler was inserted into the solid in the test tube, and the apparatus was purged with N$_2$. A take-off tube and a 5 ml receiving flask were then attached. The test tube assembly was then placed in a heated oil bath at 250° C. for 9 hours at atmospheric pressure. During this entire time, N$_2$ was bubbled through the melt to maintain mixing and entrain water. After 9 hours, a vacuum was applied via the take-off arm, and the N$_2$ bubbler was turned off. The polymerization temperature was maintained at 250° C., while a vacuum of <0.2 mm Hg was applied for 4 hours. At the end of this time, the vacuum was broken, and the melt was quenched in a dry ice-isopropanol bath. No water was formed. The copolymer was determined to contain 17 mole % p-HMBA moieties. The inherent viscosity (at 0.4 dl/g) was 0.65 dl/g in 40/60 TCE/phenol at 30° C. DSC analysis showed: Tg=43° C., Tc=98° C., and Tm=177° C. (shoulder), 192° C. (Run 7867-027).

EXAMPLE II 20 mole % methyl-p-hydroxymethylbenzoate (1.33 g) was added to ε-caprolactam 80 mole % (3.62 g) and the polymerization carried out in the procedure of Example I (11 hours, 1 atm N$_2$, 250° C. followed by 3 hours under vacuum at 250° C.). A polymer with IV=0.43 dl/g was obtained (Run 6997-104).

EXAMPLE III

In the procedure of Example I ε-caprolactam (4.52 g; 40 mmole) was heated at 250° C. for 13 hours. No water was present. No polymer was formed (Run 7867-023).

EXAMPLE IV-V

In the procedure of Example I, mole ratios of p-hydroxymethylbenzoic acid (p-HMBA) and ε-caprolactam (ε-CL) of 30/70 and 50/50 were reacted. Characteristics of the resulting copolymers, together with those of the copolymer of Example I are in the following table:

TABLE 1

| | | Mole % pHMBA/Mole % ε-CL | | | | |
|---|---|---|---|---|---|---|
| Ex | Run | Feed | Polymer (a) | Tg | Tm (b) | IV |
| I | 7867-027 | 10/90 | 17/83 | 43 | 192° C. | 0.65 dl/g |
| IV | -036 | 30/70 | 31/69 | 48 | nd | 0.43 |
| V | -046 | 50/50 | 76/24 | 54, 94 | nd | 0.46 |

(a) by 13C NMR assay (b) in TCE/phenol at 30° C.
(b) nd: not detected

EXAMPLE VI

In the procedure of Example I, the melt polymerization of ε-caprolactam in the presence of 0.1 mole % benzyl alcohol and 0.1 mole % benzoic acid resulted in a polymer with IV=0.18 dl/g. Conditions 9.25 hours at 250° C., 1 atm pressure, and 3.5 hours under vacuum at 250° C. (Run 6997-105). The relatively low molecular weight of these materials implies that one or both of the initiators are also acting as a chain capping agent. Neither benzyl alcohol nor benzoic acid by themselves initiate the ring-opening polymerization of ε-caprolactam.

EXAMPLE VII

A 500 ml resin kettle equipped with N$_2$ purge, a distillation head, and a mechanical stirrer was purged with N$_2$ and immersed in a hot oil bath at 235° C. p-(Hydroxymethyl)benzoic acid (7.58 g, 0.05 mole) and ε-caprolactam (50.9 g, 0.45 mole) were then added to the hot kettle. The temperature of the bath was then raised to 250° C., and this temperature was maintained for 9 hrs. At the end of this time the polymerization mixture was a clear, viscous fluid. A vacuum was then applied to the polymerization mixture. With the vacuum being 1-2 mm Hg and the overhead temperature 90°-95° C., a distillate was drawn off the polymerization mixture. The vacuum was maintained for 3.5 hrs., down to 0.6 mm Hg. Overhead temperature was 31° C. No further distillate was observed.

The polymerization mixture was allowed to cool to room temperature under N$_2$. Approximately 38 g of polymer were recovered; IV=0.65 dl/g, Tg=47° C., and Tm=194° C. This polymer was easily injection molded on a CSI min.-max. molder at 195° C. using a 1/16″ diameter gage tensile specimen mold. Tensile properties were then measured on an Instron tensile at 56% min$^{-1}$ after allowing the specimens to acclimate at room temperature and humidity for one and four days. After one day the properties were: yield tensile strength=7900 psi; ultimate tensile strength=5000 psi; and percent elongation at break=80. After four days the percent elongation at break had increased to 260, while the ultimate tensile strength was unaffected. (Run 8107-18.)

EXAMPLE VIII

In an apparatus similar to that described in Example VII, a mixture of p-(hydroxymethyl)benzoic acid (3.79 g, 0.025 mole) and ε-caprolactam (53.8 g, 0.475 mole) was polymerized to a IV=0.58 material. In this case the mixture was held for 15 hrs. at 240°-250° C. at atmospheric pressure before vacuum was applied for 5 hrs. The maximum vacuum attained was 0.3 mm Hg at 240° C. This example indicates that this polymer is stable to heat. (Run 8107-69.)

EXAMPLE IX

A mixture of p-(hydroxymethyl)benzoic acid (19.0 g, 0.125 mole) and ε-caprolactam (42.4 g, 0.375 mole) was placed in a 500 ml resin kettle equipped as in Example VII which had been heated to 245° C. under a N$_2$ purge. The reactants melted to clear fluid which increased in viscosity with time. This melt was maintained at 250° C. for 14 hrs., and a vacuum was then applied to the resin kettle for 5.5 hrs., final vacuum 0.5 mm Hg. An amorphous polymer, IV=0.47 dl/g was obtained. When a small portion of this material was melted, compressed between two strips of aluminum, and allowed to cool, a strong bond was obtained. (Run 8107-70.)

What is claimed is:

1. A composition comprising a thermoplastic resin from (1) lactam and (2) a compound selected from the group consisting of p-hydroxymethylbenzoic acid, m-hydroxymethylbenzoic acid and mixtures thereof in ratios of 1:20 to 20:1.

2. The composition of claim 1 wherein (1) is caprolactam.

3. The composition of claim 1 wherein said thermoplastic resin product comprises 6-aminocaproic acid and p-hydroxymethylbenzoic acid in a ratio of 20:1 to 1:1.

4. The composition of claim 1 wherein said thermoplastic resin product comprises a copolymer.

5. The composition of claim 1 wherein said thermoplastic resin product is converted to an injection molded article.

6. The composition of claim 1 wherein said thermoplastic resin product is converted to a vacuum formed article.

7. The composition of claim 1 wherein said plastic resin product is an adhesive.

* * * * *